United States Patent
Kitamura

(10) Patent No.: US 12,262,102 B2
(45) Date of Patent: Mar. 25, 2025

(54) IMAGE PROCESSING APPARATUS FOR IMPROVING IMAGE QUALITY OF VISIBLE LIGHT IMAGE, CONTROL METHOD FOR IMAGE PROCESSING APPARATUS, AND STORAGE MEDIUM

(71) Applicant: CANON KABUSHIKI KAISHA, Tokyo (JP)

(72) Inventor: Kaihei Kitamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/152,282

(22) Filed: Jan. 10, 2023

(65) Prior Publication Data

US 2023/0232085 A1 Jul. 20, 2023

(30) Foreign Application Priority Data

Jan. 18, 2022 (JP) ................. 2022-005874

(51) Int. Cl.
  *H04N 23/11* (2023.01)
  *G06V 10/14* (2022.01)
  *G06V 10/141* (2022.01)
  *G06V 10/25* (2022.01)
  *G06V 10/44* (2022.01)

(52) U.S. Cl.
  CPC .......... *H04N 23/11* (2023.01); *G06V 10/141* (2022.01); *G06V 10/25* (2022.01); *G06V 10/44* (2022.01)

(58) Field of Classification Search
  CPC .................................................. H04N 23/11
  See application file for complete search history.

(56) References Cited

U.S. PATENT DOCUMENTS

| 8,553,103 | B1* | 10/2013 | Samadani | G06V 10/145 |
| | | | | 348/364 |
| 11,949,995 | B2* | 4/2024 | Dabral | G06T 3/403 |
| 2008/0006762 | A1* | 1/2008 | Fadell | G06F 3/0383 |
| | | | | 250/201.1 |
| 2009/0073287 | A1* | 3/2009 | Shimizu | H04N 23/73 |
| | | | | 348/E9.053 |
| 2010/0290703 | A1* | 11/2010 | Sim | G06T 5/94 |
| | | | | 382/172 |
| 2011/0228220 | A1* | 9/2011 | Kamada | A61B 3/14 |
| | | | | 351/206 |

(Continued)

FOREIGN PATENT DOCUMENTS

JP 2015-126250 A 7/2015

*Primary Examiner* — Frank Johnson
(74) *Attorney, Agent, or Firm* — Cowan, Liebowitz & Latman, P.C.

(57) ABSTRACT

An image processing apparatus which is capable of calculating appropriate irradiation conditions for invisible light so as to improve the image quality of a visible light image. The image processing apparatus includes a lighting unit. A feature value of the visible light image obtained by shooting of a subject irradiated with visible light provided by the lighting unit is calculated. A feature value of invisible light image obtained by shooting of the subject irradiated with invisible light provided by the lighting unit is calculated. Irradiation conditions for the invisible light to be provided by the lighting unit are calculated based on the feature value of the visible light image and the feature value of the invisible light image.

12 Claims, 7 Drawing Sheets

(56) References Cited

U.S. PATENT DOCUMENTS

| | | | | |
|---|---|---|---|---|
| 2015/0125092 A1* | 5/2015 | Zhuo | .......................... | G06T 5/50 |
| | | | | 382/275 |
| 2018/0085014 A1* | 3/2018 | Murakami | ........... | A61B 5/6889 |
| 2019/0259148 A1* | 8/2019 | Hunt | ..................... | G06T 7/0004 |
| 2019/0356837 A1* | 11/2019 | Bakshi | ................... | H04N 7/142 |
| 2020/0077076 A1* | 3/2020 | Xue | ..................... | H04N 13/254 |
| 2020/0120314 A1* | 4/2020 | Yoshizaki | .............. | H04N 23/11 |
| 2022/0392182 A1* | 12/2022 | Tu | ........................ | H04N 25/131 |
| 2022/0400240 A1* | 12/2022 | Fujikawa | ............. | G02B 27/141 |
| 2023/0199319 A1* | 6/2023 | Nakayama | ........... | H04N 25/131 |
| | | | | 348/164 |

* cited by examiner

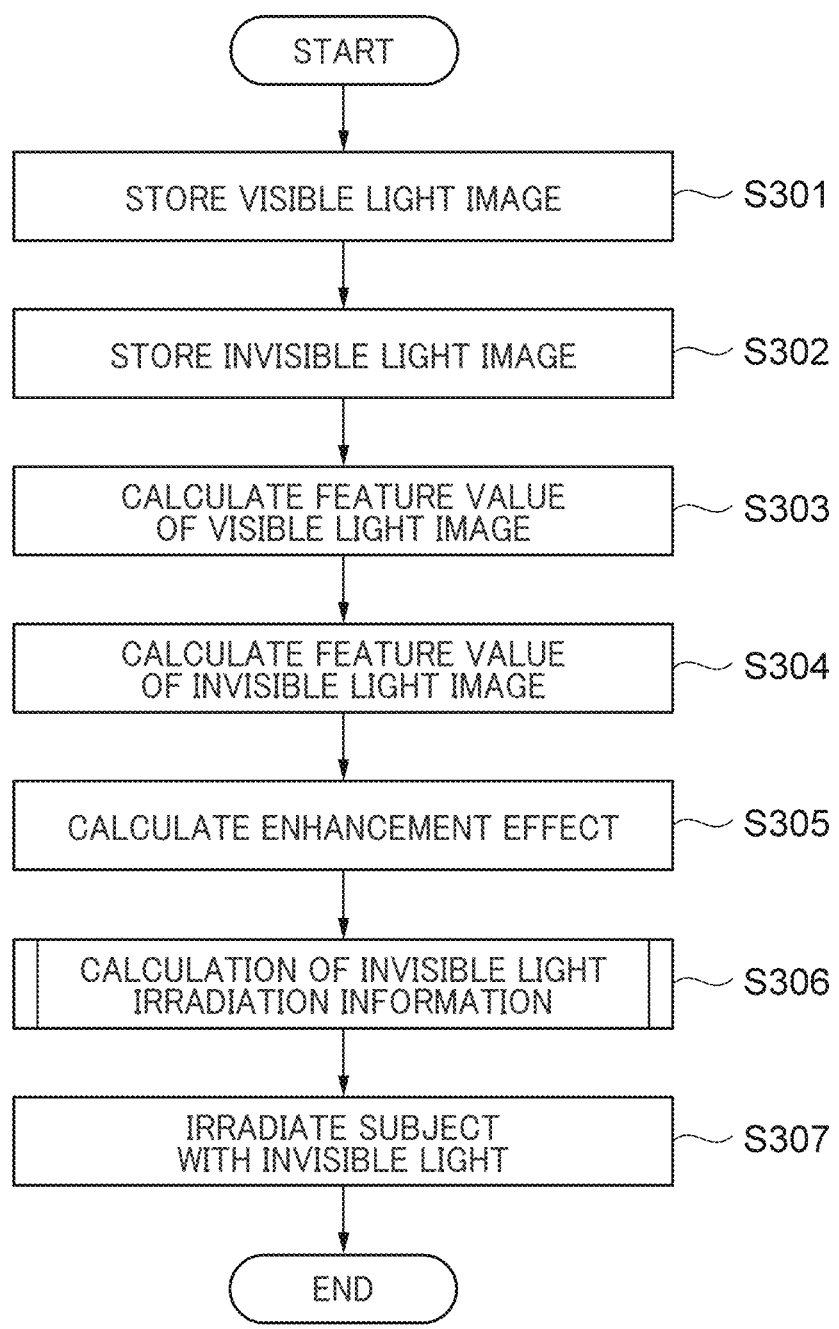

L401

L401

L601

L601

L701

L701

IMAGE PROCESSING APPARATUS FOR IMPROVING IMAGE QUALITY OF VISIBLE LIGHT IMAGE, CONTROL METHOD FOR IMAGE PROCESSING APPARATUS, AND STORAGE MEDIUM

BACKGROUND OF THE INVENTION

Field of the Invention

The present invention relates to image processing apparatuses, control methods for the image processing apparatuses, and storage media.

Description of the Related Art

Methods for improving the image quality of a visible light image with poor viewability because of haze or darkness are known, in which an invisible light image like an infrared image is used. To obtain a visible light image and an invisible light image in such methods, an image pickup device needs to capture light in a visible spectrum and light in an invisible spectrum with appropriate respective exposures. However, it is difficult to capture both a visible light image and an invisible light image with appropriate respective exposures, because, in many cases, there is a difference in intensity between visible light and invisible light, and a device operator is not allowed to set an exposure time and an aperture value independently for each of a visible light receiving element and an invisible light receiving element.

Japanese Laid-Open Patent Publication (Kokai) No. 2015-126250 discloses a technique for capturing both a visible light image and an invisible light image with appropriate respective exposures, in which brightness levels of two images differing in wavelength band are evaluated, and the amount of irradiation of a subject with light provided by a lighting device having two light sources differing in wavelength band is controlled based on the evaluation result.

However, the technique described in Japanese Laid-Open Patent Publication (Kokai) No. 2015-126250 can present a problem that the contrast and sense of resolution of a visible light image are not sufficiently improved, because the amount of irradiation of a subject with light provided by a lighting device having two light sources differing in wavelength band is controlled based on a result of an evaluation performed on the brightness levels of two images differing in wavelength band.

SUMMARY OF THE INVENTION

The present invention provides image processing apparatuses capable of calculating appropriate irradiation conditions for invisible light so as to improve the image quality of a visible light image, control methods for the image processing apparatuses, and storage media.

According to an aspect of the invention, an image processing apparatus includes a lighting unit configured to have one or more light sources which provide one or both of visible light and invisible light, and at least one processor and/or at least one circuit. The at least one processor and/or at least one circuit is configured to perform operations of: calculating a feature value of a visible light image obtained by shooting of a subject irradiated with visible light provided by the lighting unit; and calculating a feature value of an invisible light image obtained by shooting of the subject irradiated with invisible light provided by the lighting unit. The at least one processor and/or at least one circuit is configured to perform further operations of, based on the feature value of the visible light image and the feature value of the invisible light image, calculating irradiation conditions for the invisible light to be provided by the lighting unit.

According to another aspect of the invention, a control method for an image processing apparatus equipped with a lighting unit having one or more light sources which provide one or both of visible light, includes calculating a feature value of a visible light image obtained by shooting of a subject irradiated with visible light provided by the lighting unit, and calculating a feature value of an invisible light image obtained by shooting of the subject irradiated with invisible light provided by the lighting unit. The control method further includes, based on the feature value of the visible light image and the feature value of the invisible light image, calculating irradiation conditions for the invisible light to be provided by the lighting unit.

According to the present invention, appropriate irradiation conditions for invisible light are calculated so as to improve the image quality of a visible light image.

Further features of the present invention will become apparent from the following description of exemplary embodiments with reference to the attached drawings.

BRIEF DESCRIPTION OF THE DRAWINGS

FIG. 3 is a flowchart illustrating the procedure of an invisible light control process that is carried out by the image processing apparatus in FIG. 1.

DESCRIPTION OF THE EMBODIMENTS

Embodiments of the present invention will now be described in detail below with reference to the accompanying drawings showing an embodiment thereof. In order to enhance the quality of a visible light image, such as gradation, contrast and sense of resolution, an image processing apparatus according to the present embodiment is configured to adjust irradiation conditions for invisible light based on feature values of a visible light image and an invisible light image obtained by shooting of the same subject at the same angle of view, and cause a lighting unit to project invisible light to irradiate the subject. It should be noted that the irradiation conditions for invisible light include the amount of irradiation with the invisible light (irradiation amount), a direction of the irradiation with the invisible light (irradiation direction), and an area of the irradiation with the invisible light (irradiation area).

Figure 1:
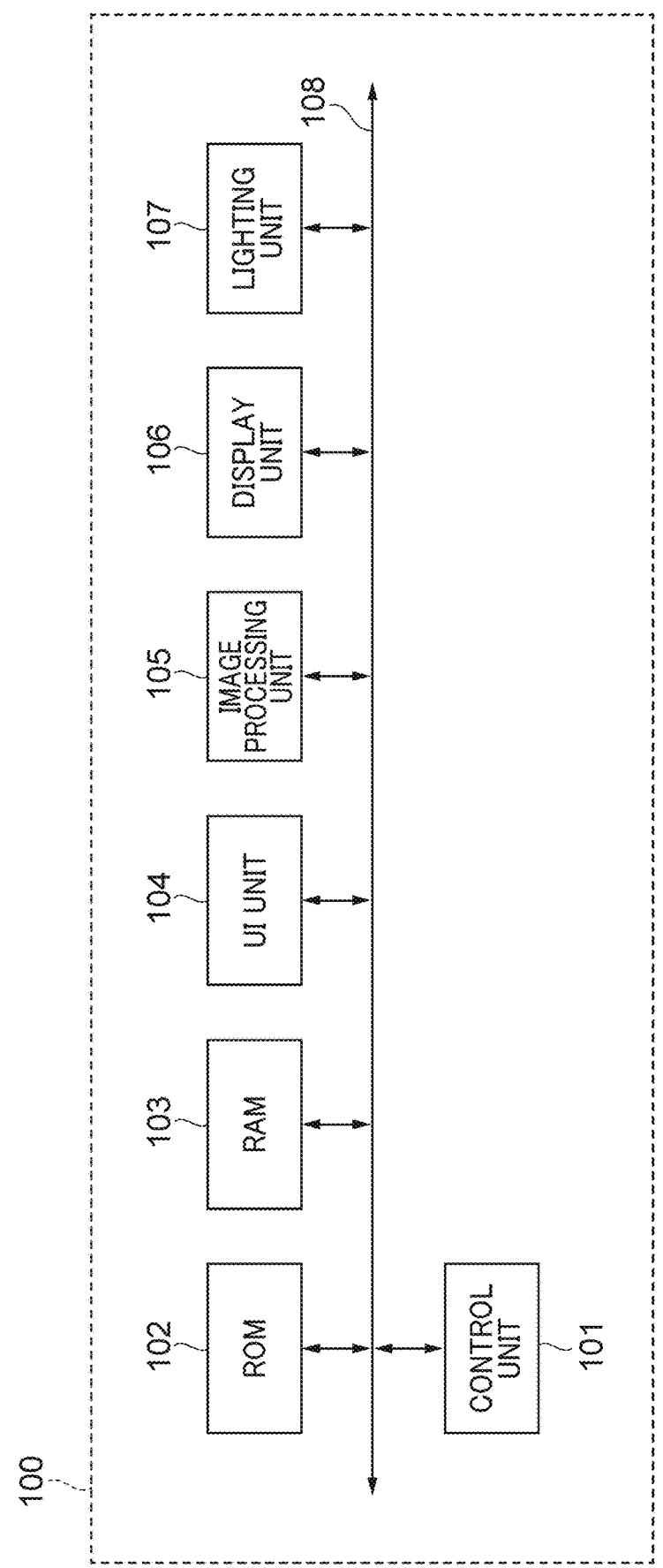
FIG. 1 is a block diagram schematically illustrating a configuration of an image processing apparatus according to an embodiment of the present invention.

FIG. 1 is a block diagram schematically illustrating a configuration of the image processing apparatus 100 according to the present embodiment. Referring to FIG. 1, the image processing apparatus 100 includes a control unit 101, a ROM 102, a RAM 103, a UI unit 104, an image processing unit 105, a display unit 106, and a lighting unit 107. These components are connected to one another via a bus 108.

The control unit 101 is, for example, a CPU. The control unit 101 reads control programs for components of the image processing apparatus 100 from the ROM 102, loads the read control programs into the RAM 103, and executes them. In this way, the control unit 101 controls operation of the components of the image processing apparats 100. The ROM 102 is an electrically erasable programmable nonvolatile memory. The ROM 102 stores the control programs for the components of the image processing apparatus 100, parameters required for operation of the components, and so forth. The RAM 103 is a rewritable volatile memory. The RAM 103 is used as an area in which a program to be executed by the control unit 101 or the like is loaded, an area where data generated by operation of the components of the image processing apparatus 100 is temporarily stored, and so forth.

The UI unit 104 is configured to receive user's operations on the image processing apparatus 100. Examples of the UI unit 104 include a pointing device and a keyboard. Examples of the pointing device include a touch screen panel and a mouse. The image processing unit 105 is configured to perform image processing such as white balance, color interpolation, and gamma processing on image data stored in the RAM 103. The image processing unit 105 includes an irradiation condition calculation unit 200 for invisible light in FIG. 2, which will be described later. The image processing unit 105 may use a processor like a GPU or an exclusive circuit to implement the above image processing and operation of components of the irradiation condition calculation unit 200 for invisible light in accordance with control instructions from the control unit 101. The display unit 106 is configured to display images stored in the ROM 102. The display unit 106 is a display device like a smartphone or a television. The display unit 106 is further configured to display a UI (user interface) for receiving instructions from a user. The lighting unit 107, which is, for example, a flash, is configured to have one or more light sources which provide one or both of visible light and invisible light to irradiate a subject. The lighting unit 107 is further configured to provide invisible light using the irradiation amount, irradiation direction, and irradiation area that have been adjusted based on invisible light irradiation information calculated by the image processing unit 105, which will be described later.

Figure 2:
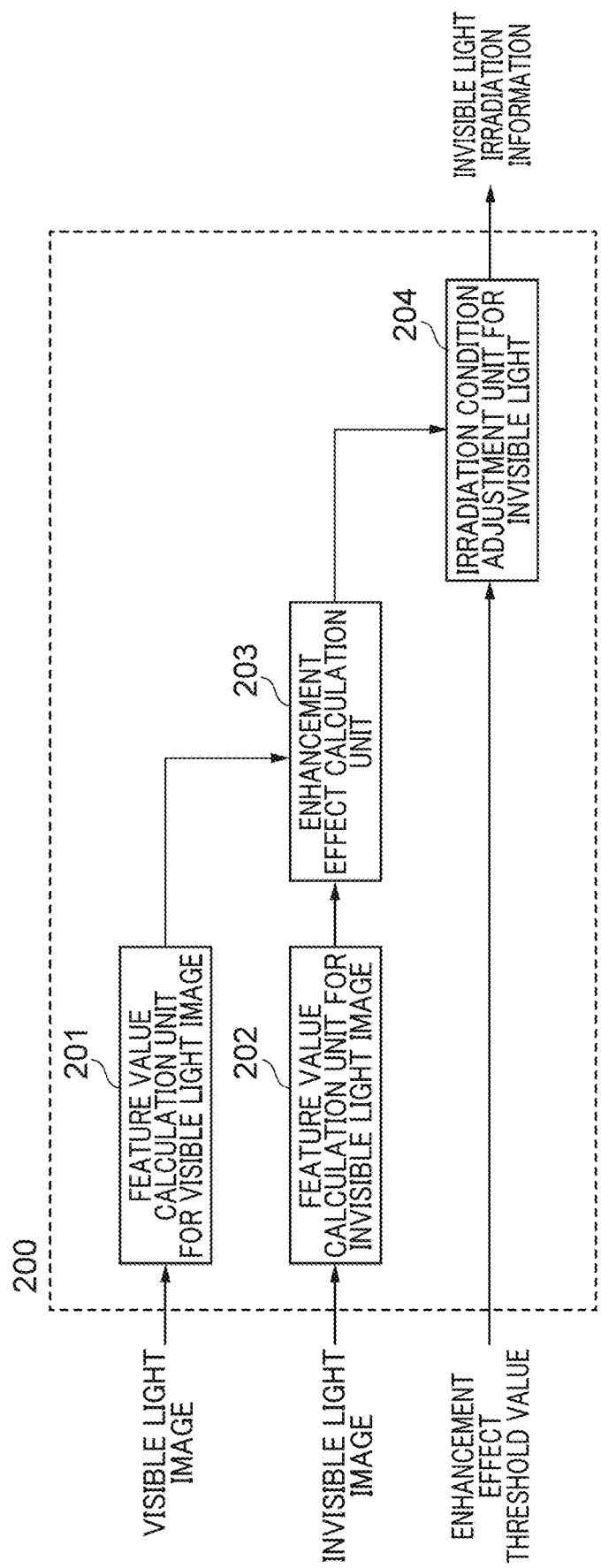
FIG. 2 is a block diagram schematically illustrating a configuration of an irradiation condition calculation unit for invisible light in the image processing apparatus in FIG. 1.

FIG. 2 is a block diagram schematically illustrating a configuration of the irradiation condition calculation unit 200 for invisible light, which is included in the image processing apparatus 100 in FIG. 1. The irradiation condition calculation unit 200 for invisible light includes a feature value calculation unit 201 for a visible light image, a feature value calculation unit 202 for an invisible light image, an enhancement effect calculation unit 203, and an irradiation condition adjustment unit 204 for invisible light.

The feature value calculation unit 201 for a visible light image is configured to calculate a feature value of a visible light image obtained by shooting of a subject irradiated with visible light provided by the lighting unit 107. Examples of the feature value of the visible light image include gradation information on the brightness component of the visible light image. To extract the gradation information, the feature value calculation unit 201 for a visible light image is configured to apply a bandpass filtering process, which allows through components in a specified band of frequencies, to the brightness component of the visible light image (for example, the intensity component or the I component in the ICtCp color space of the visible light image), thereby extracting information on an AC component of the brightness component of the visible light image (for example, an alternating-current component and its magnitude within the specified band of spatial frequencies in data obtained by extracting the brightness component from the visible light image), which indicates the gradation information. The feature value calculation unit 201 for a visible light image is configured to output the gradation information as the feature value of the visible light image to the enhancement effect calculation unit 203.

The feature value calculation unit 202 for an invisible light image is configured to calculate a feature value of an invisible light image obtained by shooting of a subject irradiated with invisible light like infrared light provided by the lighting unit 107. Examples of the feature value of the invisible light image include gradation information on the invisible light image. To extract the gradation information, the feature value calculation unit 202 for an invisible light image is configured to apply a bandpass filtering process, which allows through components in a specified band of frequencies, to the invisible light image, thereby extracting information on an AC component of the invisible light image (for example, an alternating-current component and its magnitude within the specified band of spatial frequencies of the invisible light image), which indicates the gradation information. The feature value calculation unit 202 for an invisible light image is configured to output the gradation information as the feature value of the invisible light image to the enhancement effect calculation unit 203.

The enhancement effect calculation unit 203 is configured to calculate an enhancement effect based on the feature value of the visible light image obtained from the feature value calculation unit 201 for a visible light image and the feature value of the invisible light image obtained from the feature value calculation unit 202 for an invisible light image. The enhancement effect means an effect of improving gradation, contrast, sense of resolution, and so forth of an image. Based on the enhancement effect calculated by the enhancement effect calculation unit 203 and optionally an enhancement effect threshold value, the irradiation condition adjustment unit 204 for invisible light is configured to calculate invisible light irradiation information that represents irradiation conditions for irradiation of a subject with invisible light to be provided by the lighting unit 107.

FIG. 3 is a flowchart illustrating the procedure of an invisible light control process that is carried out by the image processing apparatus 100 in FIG. 1. The invisible light control process in FIG. 3 is implemented by the control unit 101 loading a control program read from the ROM 102 into the RAM 103 and executing the control program. In the invisible light control process in FIG. 3, it is assumed that the image processing apparatus 100 has already obtained a visible light image and an invisible light image, which are obtained by an image pickup apparatus shooting the same subject at the same angle of view while switching light provided by the lighting unit 107 from one to another. The visible light image is an image obtained by shooting of the subject irradiated with visible light provided by the lighting unit 107, and the invisible light image is an image obtained by shooting of the subject irradiated with invisible light provided by the lighting unit 107. It should be noted that although in the description of the present embodiment, the image processing apparatus 100 is configured to obtain the visible light image and the invisible light image from an image pickup apparatus that shot a subject, the image processing apparatus 100 is not limited to this. For example, the image processing apparatus 100 may be equipped with an image pickup unit, which generates a visible light image and an invisible light image by capturing images of a subject.

Referring to FIG. 3, first, the control unit 101 causes the RAM 103 to store the obtained visible light image (step S301). Next, the control unit 101 causes the RAM 103 to store the obtained invisible light image (step S302). Then, the control unit 101 causes the feature value calculation unit 201 for a visible light image in the image processing unit 105 to calculate a feature value of the visible light image stored in the RAM 103 (step S303). After that, the control unit 101 causes the feature value calculation unit 202 for an invisible light image of the image processing unit 105 to calculate a feature value of the invisible light image stored in the RAM 103 (step S304).

Figure 4A:
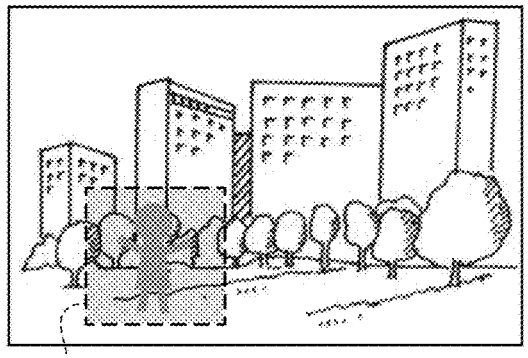
FIGS. 4A and 4B are views illustrating examples of gradation information on a visible light image and an invisible light image obtained by the image processing apparatus in FIG. 1.
Figure 4B:
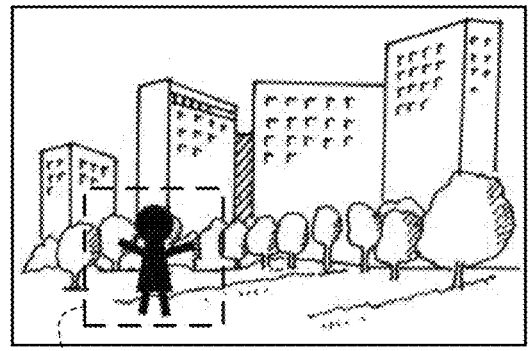

Then, the control unit 101 causes the enhancement effect calculation unit 203 in the image processing unit 105 to calculate the enhancement effect based on the feature value of the visible light image and the feature value of the invisible light image (step S305). Referring to FIGS. 4A and 4B, a description will now be given of how to calculate the enhancement effect. FIG. 4A is a view illustrating an example of gradation information on the visible light image, and FIG. 4B is a view illustrating an example of gradation information on the invisible light image. In the step S305, the control unit 101 causes the enhancement effect calculation unit 203 to calculate a difference in gradation information between corresponding areas in the visible light image and the invisible light image, and more specifically, a difference between gradation information in a predetermined area L401 in the visible light image and gradation information in the predetermined area L401 in the invisible light image. The predetermined area L401 is an area specified by a user or a low-contrast area in the visible light image where the gradation information is equal to or smaller than a predetermined value. The predetermined area L401 in FIG. 4A gives an example in which gradation is insufficient due to haze or the like. On the other hand, the predetermined area L401 in FIG. 4A gives an example in which an image signal representing satisfactory gradation is presented due to wavelength characteristics which the invisible light has. The enhancement effect calculation unit 203 outputs a result of the calculation as the enhancement effect to the irradiation condition adjustment unit 204 for invisible light.

Figure 5:
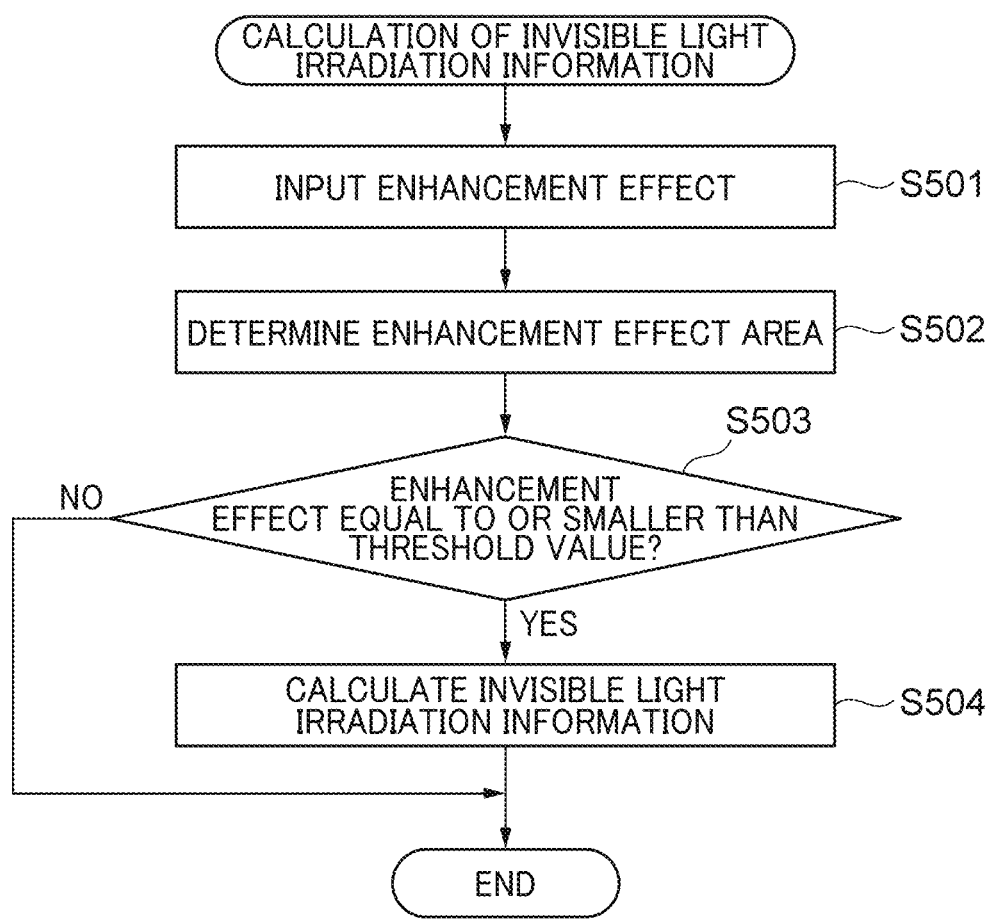
FIG. 5 is a flowchart illustrating the procedure of calculating invisible light irradiation information in step S306 in FIG. 3.

Then, the control unit 101 causes the image processing unit 105 to obtain invisible light irradiation information by carrying out a calculation process for the invisible light irradiation information, which will be described later with reference to FIG. 5 (step S306). After that, the control unit 101 causes the lighting unit 107 to provide invisible light to irradiate the subject, using the irradiation amount, irradiation direction, and irradiation area that have been adjusted based on the invisible light irradiation information (step S307), and ends the present process. FIG. 5 is a flowchart illustrating the procedure of calculation of the invisible light irradiation information in the step S306 in FIG. 3. The calculation of the invisible light irradiation information is carried out by the image processing unit 105.

Referring to FIG. 5, the enhancement effect calculation unit 203 of the image processing unit 105 inputs the calculated enhancement effect to the irradiation condition adjustment unit 204 for invisible light (step S501). Next, the irradiation condition adjustment unit 204 for invisible light in the image processing unit 105 determines an enhancement effect area for determining the irradiation direction and the irradiation area for invisible light (step S502). The enhancement effect area preferably corresponds to a part of a shooting area of a visible light image and an invisible light image obtained by shooting of the same subject at the same angle of view. According to the determination, in shooting of an invisible light image for improving the image quality of a visible light image, irradiation of a subject with invisible light is optimized to improve the image quality of a part of the shooting area particularly in need of the image quality improvement. In the step S502, the irradiation condition adjustment unit 204 for invisible light determines an area specified by a user via the UI unit 104, which is for example a touch screen panel, as the enhancement effect area. As a result, the intent of the user is reflected on the determination as to the irradiation direction and the irradiation area for the invisible light. Alternatively, the irradiation condition adjustment unit 204 for invisible light may determine, as the enhancement effect area, a low-contrast area in the visible light image where the gradation information is equal to or smaller than a predetermined value. As a result, the image processing apparatus 100 is allowed to determine an area assumed to be in need of image quality improvement as the enhancement effect area by itself without requesting a user to perform an operation of specifying the area.

Figure 6A:
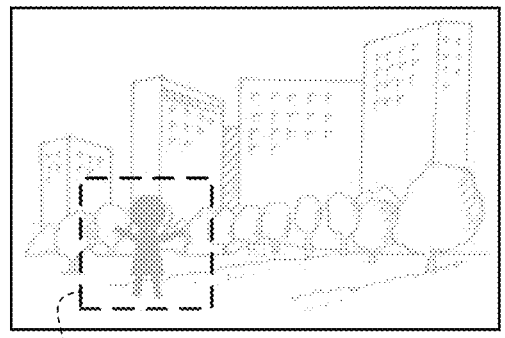
FIGS. 6A and 6B are views useful in explaining determination in step S503 in FIG. 5.
Figure 6B:
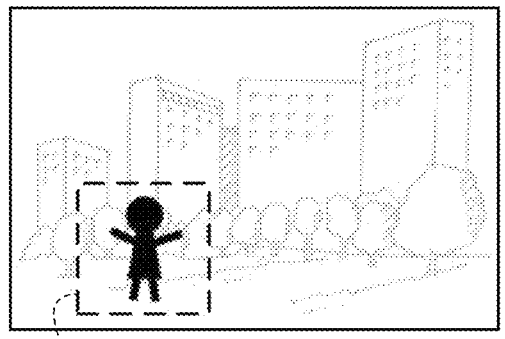

Then, the irradiation condition adjustment unit 204 for invisible light determines whether or not the enhancement effect in the enhancement effect area determined in the step S502 is equal to or smaller than a threshold value (step S503). FIG. 6A illustrates an example in which the enhancement effect in the enhancement effect area is equal to or smaller than the threshold value, and FIG. 6B illustrates an example in which the enhancement effect in the enhancement effect area is greater than the threshold value, where an area L601 in each of FIG. 6A and FIG. 6B indicates the enhancement effect area.

Figure 7A:
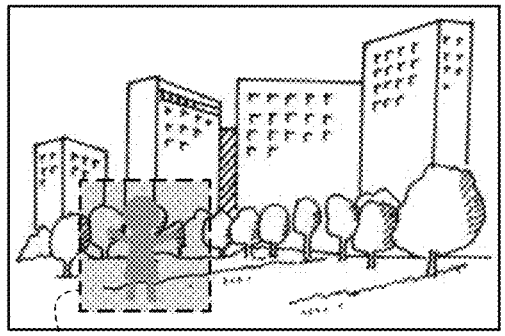
FIGS. 7A and 7B are views useful in explaining how invisible light irradiation information is calculated in step S504 in FIG. 5.
Figure 7B:
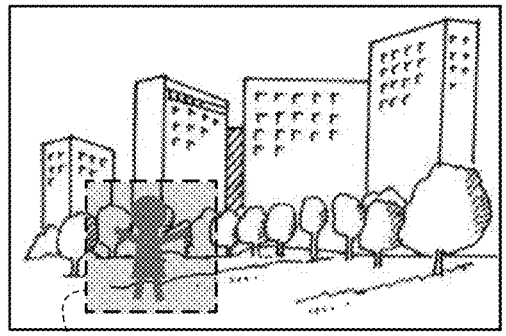

In the step S503, when the enhancement effect in the enhancement effect area determined in the step S502 is equal to or smaller than the threshold value (see, for example, FIG. 6A), the irradiation condition adjustment unit 204 for invisible light calculates invisible light irradiation information so that the enhancement effect in the enhancement effect area can be greater than the threshold value (step S504). A description will now be given of how to calculate the invisible light irradiation information. FIG. 7A is a view illustrating gradation information on a visible light image, and FIG. 7B is a view illustrating gradation information on an invisible light image. An area L701 in each of FIG. 7A and FIG. 7B indicates the enhancement effect area, which gives an example in which insufficient gradation is given in the area due to haze or the like. That is, the area L701 corresponds to the area L601.

For example, in an invisible light image shot with insufficient exposure, gradation information is insufficient, as illustrated in FIG. 7B, because of residual effects of haze or the like. Thus, the enhancement effect, which is a difference between gradation information on such an invisible light image and gradation information on a visible light image, is equal to or smaller than the threshold value. In this case, in the step S504, the irradiation condition adjustment unit 204 for invisible light determines the irradiation direction and irradiation area for invisible light such that an area corresponding to the enhancement effect area is irradiated with the invisible light, and further determines the irradiation amount for invisible light, based on the enhancement effect. The irradiation condition adjustment unit 204 for invisible light outputs the determined irradiation direction, irradiation area, and irradiation amount as the invisible light irradiation information. After that, the present process is ended.

In the step S503, when the enhancement effect in the enhancement effect area determined in the step S502 is greater than the threshold value (see, for example, FIG. 6B), the present process is ended.

According to the embodiment described above, based on the feature value of a visible light image and the feature value of an invisible light image, the invisible light irradiation information representing the irradiation conditions for invisible light to be provided by the lighting unit 107 is calculated. It realizes optimized irradiation of a subject with the invisible light in shooting of an invisible light image for image quality improvement of a visible light image, which improves the quality of the visible light image.

It should be noted that the control unit 101 may cause the lighting unit 107 to provide invisible light to irradiate a subject, using the irradiation amount, irradiation direction, and irradiation area that have been adjusted based on the invisible light irradiation information calculated in the step S504, obtain an invisible light image from an image pickup apparatus shooting of the irradiated subject, and based on the invisible light image, carry out the above-described invisible light control process again. In this case, when a desired enhancement effect cannot be achieved even by irradiation of the subject with the invisible light using the irradiation amount, irradiation direction, and irradiation area that have been adjusted based on the invisible light irradiation information, the irradiation amount, irradiation direction, and irradiation area for the invisible light are allowed to be adjusted again.

In the embodiment described above, shooting conditions for shooting a subject may be adjusted based on the feature value of a visible light image, the feature value of an invisible light image, and the invisible light irradiation information. Examples of the shooting conditions include an ISO sensitivity, an f number, and a shutter speed. Thus, the image quality of a visible light image can be improved by optimization of the shooting conditions as well as the irradiation amount, irradiation direction, and irradiation area for invisible light.

Moreover, in the embodiment described above, when the invisible light irradiation information includes information beyond the specifications of the lighting unit 107, the image processing apparatus 100 may issue a warning via an output device thereof in accordance with an instruction from the control unit 101. For example, when the invisible light irradiation information includes at least one of the following information: the irradiation amount beyond an upper limit to the amount of irradiation with light that the lighting unit 107 is capable of providing, an irradiation direction other than directions in which the lighting unit 107 is capable of providing light, and an irradiation area other than an area where the lighting unit 107 is capable of providing light, the control unit 101 causes the display unit 106 to display a warning notification. This informs a user that the adjustment of invisible light has reached its limits.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-005874 filed on Jan. 18, 2022 which is hereby incorporated by reference wherein in its entirety.

What is claimed is:

1. An image processing apparatus comprising:
a lighting unit configured to have one or more light sources which provide one or both of visible light and invisible light; and
at least one processor and/or at least one circuit configured to perform operations of:
calculating a feature value comprising spatial gradation information of a visible light image obtained by shooting of a subject irradiated with visible light provided by the lighting unit;
calculating a feature value comprising spatial gradation information of an invisible light image obtained by shooting of the subject irradiated with invisible light provided by the lighting unit; and
calculating an enhancement effect for the invisible light based on the feature value including the spatial gradation information of the visible light image and the feature value including the spatial gradation information of the invisible light image, and calculating and applying, based at least on the calculated enhancement effect, irradiation conditions for the invisible light to be provided by the lighting unit.

2. The image processing apparatus according to claim 1, wherein the at least one processor and/or the at least one circuit is configured to perform further operations of, based on the feature value of the visible light image, the feature value of the invisible light image, and the irradiation conditions for the invisible light, adjusting shooting conditions under which the subject is shot.

3. The image processing apparatus according to claim 1, wherein the irradiation conditions for the invisible light include an amount of irradiation with the invisible light, a direction of the irradiation with the invisible light, and an area of the irradiation with the invisible light.

4. The image processing apparatus according to claim 3, wherein the at least one processor and/or the at least one circuit is configured to perform further operations of determining an area used for determination of the direction of the irradiation with the invisible light and the area of the irradiation with the invisible light.

5. The image processing apparatus according to claim 4, further comprising a user interface that receives operations performed by a user,
wherein an area specified by the user via the user interface is determined as the area used for the determination.

6. The image processing apparatus according to claim 4, wherein the feature value of the visible light image is spatial gradation information on the visible light image, and
an area in the visible light image where the spatial gradation information is equal to or smaller than a predetermined value is determined as the area used for the determination.

7. The image processing apparatus according to claim 1, wherein the at least one processor and/or the at least one circuit is configured to perform further operations of issuing a warning when the irradiation conditions for the invisible light are beyond specifications of the lighting unit.

8. The image processing apparatus according to claim 1, wherein the spatial gradation information of the visible light image is obtained by applying a bandpass filtering that allows through components in a specified band of frequencies to the visible light image, and extracting information on an alternating-current component and magnitude within the specified band of spatial frequencies in data obtained from the visible light image, and wherein the spatial gradation information of the invisible light image is obtained by applying a bandpass filtering that allows through components in a specified band of frequencies to the invisible light image, and extracting information on an alternating-current component and magnitude within the specified band of spatial frequencies in data obtained from the invisible light image.

9. A control method for an image processing apparatus equipped with a lighting unit having one or more light sources which provide one or both of visible light, the control method comprising:
calculating a feature value comprising spatial gradation information of a visible light image obtained by shooting of a subject irradiated with visible light provided by the lighting unit;
calculating a feature value comprising spatial gradation information of an invisible light image obtained by shooting of the subject irradiated with invisible light provided by the lighting unit; and
calculating an enhancement effect for the invisible light based on the feature value including the spatial gradation information of the visible light image and the feature value including the spatial gradation information of the invisible light image, calculating and applying, based at least on the calculated enhancement effect, irradiation conditions for the invisible light to be provided by the lighting unit.

10. The method of claim 9, wherein calculating spatial gradation information of the visible light image comprises applying a bandpass filtering that allows through components in a specified band of frequencies to the visible light image, and extracting information on an alternating-current component and magnitude within the specified band of spatial frequencies in data obtained from the visible light image, and wherein calculating spatial gradation information of the invisible light image comprises applying a bandpass filtering that allows through components in a specified band of frequencies to the invisible light image, and extracting information on an alternating-current component and magnitude within the specified band of spatial frequencies in data obtained from the invisible light image.

11. A non-transitory computer-readable storage medium storing a program for causing a computer to execute a control method for an image processing apparatus equipped with a lighting unit having one or more light sources which provide one or both of visible light, the control method comprising:
calculating a feature value comprising spatial gradation information of a visible light image obtained by shooting of a subject irradiated with visible light provided by the lighting unit;
calculating a feature value comprising spatial gradation information of an invisible light image obtained by shooting of the subject irradiated with invisible light provided by the lighting unit; and
calculating an enhancement effect for the invisible light based on the feature value including the spatial gradation information of the visible light image and the feature value including the spatial gradation information of the invisible light image, calculating and applying, based at least on the calculated enhancement effect, irradiation conditions for the invisible light to be provided by the lighting unit.

12. The non-transitory computer-readable storage medium of claim 11, wherein the spatial gradation information of the visible light image is obtained by applying a bandpass filtering that allows through components in a specified band of frequencies to the visible light image, and extracting information on an alternating-current component and magnitude within the specified band of spatial frequencies in data obtained from the visible light image, and wherein the spatial gradation information of the invisible light image is obtained by applying a bandpass filtering that allows through components in a specified band of frequencies to the invisible light image, and extracting information on an alternating-current component and magnitude within the specified band of spatial frequencies in data obtained from the invisible light image.

* * * * *